United States Patent
Chaganti (10) Patent No.: US 8,726,269 B2
(45) Date of Patent: May 13, 2014

(54) METHOD TO ENABLE APPLICATION SHARING ON EMBEDDED HYPERVISORS BY INSTALLING ONLY APPLICATION CONTEXT

(75) Inventor: Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1015 days.

(21) Appl. No.: 12/423,453

(22) Filed: Apr. 14, 2009

(65) Prior Publication Data

US 2010/0262962 A1 Oct. 14, 2010

(51) Int. Cl.
*G06F 9/445* (2006.01)
*G06F 9/50* (2006.01)
*G06F 9/455* (2006.01)
*G06F 3/06* (2006.01)
*G06F 11/14* (2006.01)

(52) U.S. Cl.
CPC *G06F 8/61* (2013.01); *G06F 9/505* (2013.01); *G06F 9/45533* (2013.01); *G06F 9/45554* (2013.01); *G06F 3/0626* (2013.01); *G06F 3/0655* (2013.01); *G06F 11/1484* (2013.01)
USPC ............ 717/174; 717/177; 718/102; 711/6

(58) Field of Classification Search
CPC .......... G06F 8/60–8/63; G06F 8/4434; G06F 9/45533; G06F 9/4554; G06F 9/505; G06F 2009/45566; G06F 2009/45595; G06F 3/0626; G06F 3/1218; G06F 3/0655; G06F 11/1484
USPC .......... 717/101–178; 709/202, 211, 217–219; 719/317, 332; 718/1; 705/53; 707/822, 707/999.001, 999.103
See application file for complete search history.

(56) References Cited

U.S. PATENT DOCUMENTS

| 5,966,540 | A | * | 10/1999 | Lister et al. | 717/174 |
| 6,430,564 | B1 | * | 8/2002 | Judge et al. | 1/1 |
| 6,986,148 | B2 | * | 1/2006 | Johnson et al. | 719/332 |
| 7,606,868 | B1 | * | 10/2009 | Le et al. | 709/211 |
| 7,774,391 | B1 | * | 8/2010 | Le et al. | 707/822 |

(Continued)

FOREIGN PATENT DOCUMENTS

WO WO 2010057526 A1 * 5/2010 ............ G06F 9/445

OTHER PUBLICATIONS

Design Tradeoffs in Applying Content Addressable Storage to Enterprise-scale Systems Based on Virtual Machines Partho Nath, Michael A. Kozuch, David R. O'Hallaron, Jan Harkes, M. Satyanarayanan, Niraj Tolia, and Matt Toups Penn State University, Intel Research Pittsburgh, and Carnegie Mellon University—2006 USENIX Annual Technical Conference.*

*Primary Examiner* — Lewis A Bullock, Jr.
*Assistant Examiner* — Francisco Aponte
(74) *Attorney, Agent, or Firm* — Terrile, Cannatti, Chambers & Holland, LLP; Stephen A. Terrile (57) ABSTRACT

A system and method for reducing storage space requirements for an embedded hypervisor. The system and method includes installing an application context on a hypervisor while installing files needed by the applications to a shared storage device. Such a system and method provides a unique application context install. Additionally, such a system and method uniquely shares applications while reducing the space occupied on the embedded device. Also, such system and a method uniquely loads applications from remote storage without actually caching the applications on a local system.

15 Claims, 4 Drawing Sheets

(56) References Cited

U.S. PATENT DOCUMENTS

| | | | |
|---|---|---|---|
| 7,810,092 B1* | 10/2010 | van Rietschote et al. | 718/1 |
| 8,370,835 B2* | 2/2013 | Dittmer | 718/1 |
| 2004/0205772 A1* | 10/2004 | Uszok et al. | 719/317 |
| 2007/0028244 A1 | 2/2007 | Landis et al. | |
| 2007/0067435 A1 | 3/2007 | Landis et al. | |
| 2007/0136577 A1 | 6/2007 | Bade et al. | |
| 2007/0169005 A1* | 7/2007 | Drepper | 717/131 |
| 2007/0260702 A1* | 11/2007 | Richardson et al. | 709/217 |
| 2007/0283324 A1* | 12/2007 | Geisinger | 717/120 |
| 2008/0028401 A1* | 1/2008 | Geisinger | 718/1 |
| 2008/0082447 A1* | 4/2008 | Jogand-Coulomb et al. | 705/53 |
| 2008/0168461 A1 | 7/2008 | Arndt et al. | |
| 2009/0037906 A1 | 2/2009 | Armstrong et al. | |
| 2009/0217260 A1* | 8/2009 | Gebhart et al. | 717/174 |
| 2009/0327576 A1* | 12/2009 | Oshins | 711/6 |
| 2010/0162238 A1* | 6/2010 | Warfield | 718/1 |
| 2010/0262962 A1* | 10/2010 | Chaganti | 717/174 |

\* cited by examiner

METHOD TO ENABLE APPLICATION SHARING ON EMBEDDED HYPERVISORS BY INSTALLING ONLY APPLICATION CONTEXT

BACKGROUND OF THE INVENTION

1. Field of the Invention

The present invention relates to the information handling systems and more particularly to application sharing on embedded hypervisors.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to perform a virtualization function on an information handling system. With application virtualization, an application is not installed in a traditional sense, although the application is executed as if it is installed. Application virtualization includes many different technologies.

For example, with an application streaming solution, an application is delivered in a package that may include a subset of operating system files and configuration settings. To execute the package, a lightweight client application is installed onto the information handling system. The package is generally delivered to the information handling system via a protocol such as a hypertext transfer protocol (HTTP) or a real time streaming protocol (RTSP). Also for example, with a desktop virtualization solution, also referred to as virtual desktop infra (VDI), an application is hosted in a virtual machine that also includes the operating system. These solutions include a management infrastructure for automating the creation of virtual desktops and providing access control to target virtual desktops. A VDI solution is generally more robust than an application streaming solution. Also for example, with a self contained virtual machine solution, a package is launched with a relatively small runtime player (which may be bundled with the package) and can be launched from a portable virtual appliance device such as a portable USB flash drive. Examples of a runtime player include a VMWare type player or a VMplayer type player.

Each of these technologies can include issues relating to application compatibility and conflicts presented by introducing a virtualization layer to hide the operating system and/or hardware details from the application and vice versa. Some issues relating to these technologies include a need for specialized software (e.g., agents) to be installed on the hypervisor, a need for the application to be packaged specifically for the virtualization environment.

With certain virtualization type systems (e.g., the embedded ESX type virtualization system available from VMWare and the Xen Sources embedded hypervisor), hypervisors are installed onto a memory card or flash device Storage space available on these types of storage devices is often limited (e.g., often not more than 1 GByte). Hence, these types of storage devices may run out of space as customers install support applications such as backup type applications, firewall type applications, antivirus type applications, etc. Also, these storage devices may not be intended for frequent write access and may have a limited write lifespan.

Software emulation is another type of application virtualization which can be used to execute applications in and unsupported environment. Zero install technology can be used to package and distribute applications as a single file. When user accesses the software for the first time, the software is downloaded from the Internet and cached on a local system.

SUMMARY OF THE INVENTION

In accordance with the present invention, a method for reducing storage space requirements for an embedded hypervisor is set forth. The method includes installing an application context on a hypervisor while installing files needed by the applications to a shared storage device. Such a method provides a unique application context install. Additionally, such a method uniquely shares applications while reducing the space occupied on the embedded device. Also, such a method uniquely loads applications from remote storage without actually caching the applications on a local system.

In such a system, storage space on the embedded device is not used for application installs. Additionally, only the first system needs to have a complete install. All similar systems only need install the application context and the path for the shared storage. Also in such a system, applications can be easily shared between various hypervisor systems. Also, such a system can be implemented without requiring modifications to applications or operating systems.

More specifically, in certain embodiments, when performing an application context only install, the method includes a universal software installer application that initiates any software install within a hypervisor operating system. The universal software installer application takes a setup path of an actual application installer and a File Path refers to a shard storage device. The universal software installer application achieves an application context only install by interpreting a setup.exe application and monitoring various actions performed by the setup operation. For example, all file copy operations are redirected to the shared storage. The universal software installer application achieves an application context only install by performing any registry modifications and/or configuration file modifications on the local system. The universal software installer application achieves an application context only install by placing symbolic links to files needed for application startup on the local system. For example, files copied by the universal software installer application to the local system root such as a c:/windows/system32 system root in a Microsoft Windows environment. The universal software installer application achieves an application context only install by modifying the application startup to include a startup binary as an application starting point. The universal software installer application achieves an application context only install by whatever changes were made to the local system are captured as an XML manifest file so that the same can be used to install application context on any other similar system while using the same set of files copied to shared storage.

Also, in certain embodiments, when performing a share application load procedure, at the end of an application install, the universal software installer application modifies the installed application startup path to include a hypervisor application startup binary (e.g., referred to as a HVAppStart binary). The hypervisor application startup binary invokes the shared application by creating a lock on the shared storage to prevent any conflicts while loading the application. The hypervisor application startup binary starts loading the application from the remote storage. The hypervisor application startup binary exits gracefully and leaves the application loaded as an independent entity in the memory. After the hypervisor application startup binary completes loading the shared application, the generated lock is removed. The point on the application on the local system resides in the memory. The operating system controls paging in and out of this application from the memory as needed. Thus, this application behaves as if it is loaded from local storage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
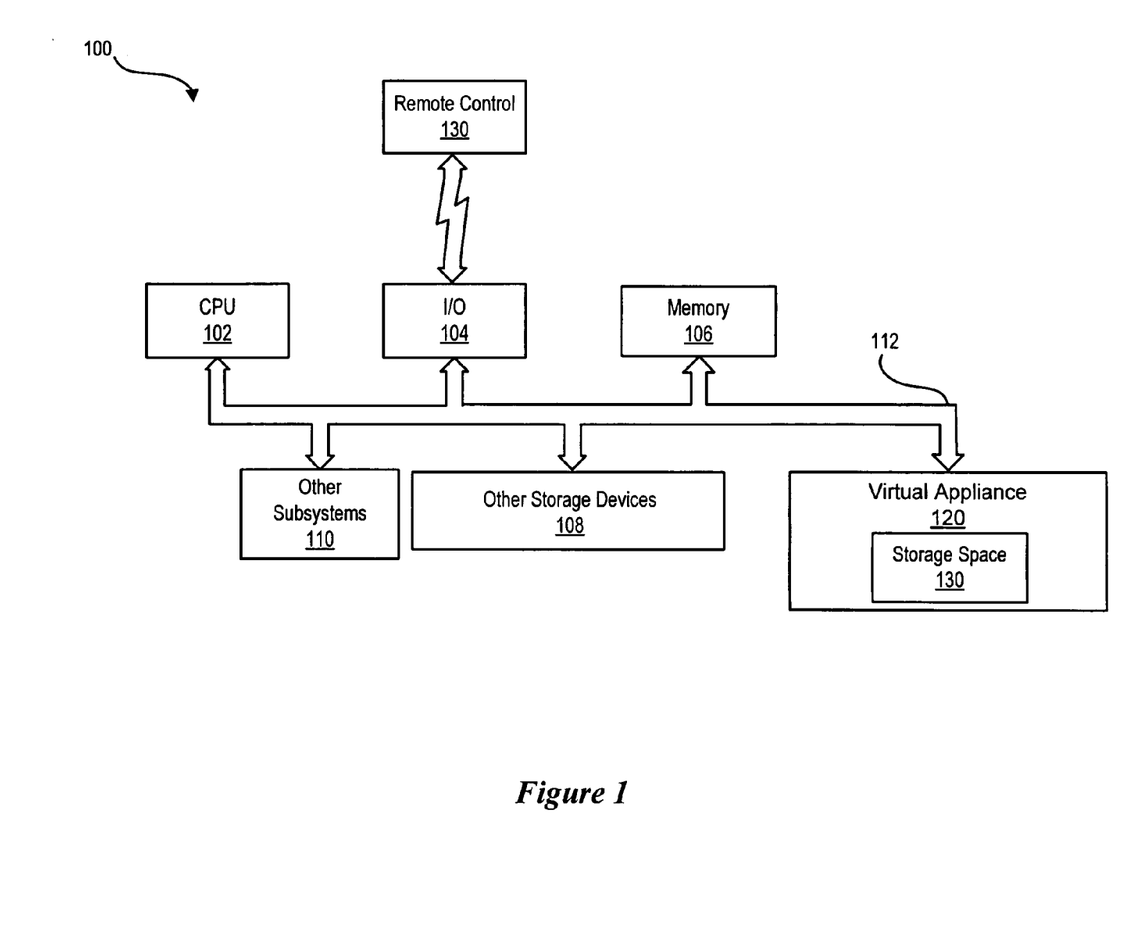
FIG. 1 shows a system block diagram of an information handling system.

Referring briefly to FIG. 1, a system block diagram of a consumer electronics type information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112. The information handling system 100 also includes a a virtual appliance device 120 such as a virtual appliance USB key which may be optionally coupled to the information handling system 100 via the one or more buses 112. The I/O devices 104 can also include a remote control 130.

The virtual appliance device 120 can include one or a plurality of virtual appliances. Each virtual appliance is a self-contained virtual machine that implements a consumer solution (including an operating system (OS), and application and a default configuration). Examples of self-contained virtual machines can include a productivity module and browser, a media server/content delivery module, a home finance/online banking module, a gaming module, a personal networking module, a home automation and security module, and a home design and maintenance module. Because the virtual machines are self-contained and isolated using virtualization technology, each solution can be preconfigured and ready to use, without a customer having to install and configure the solution. Additionally, the virtual machines provide a stable platform which have no variability when moved from one user or system to another user or system.

Figure 2:
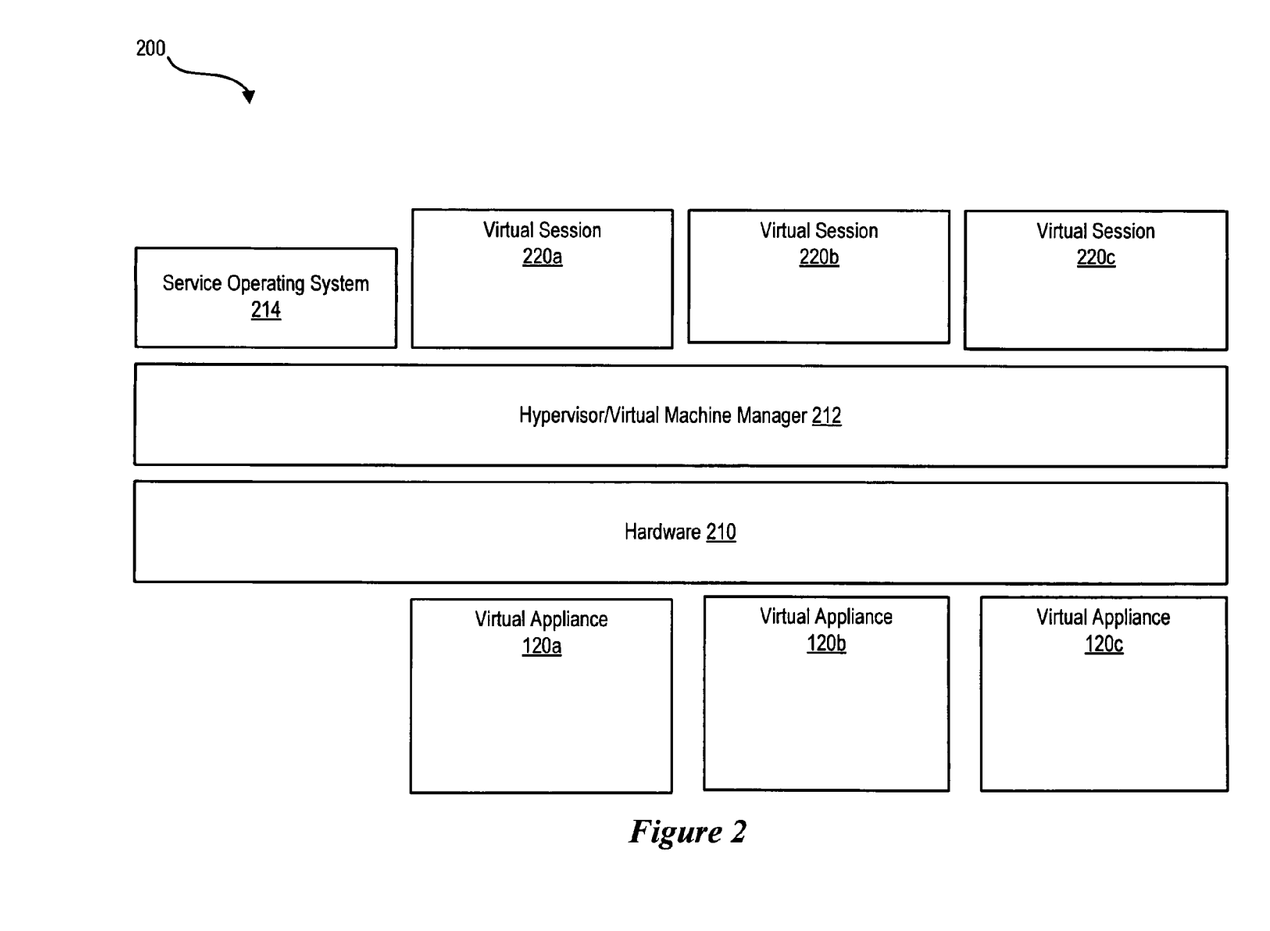
FIG. 2 shows a system block diagram of an information handling system infrastructure architecture.

Each of the virtual appliances interacts cooperatively with the information handling system 100 via a respective virtual appliance USB key 120 (e.g., a personalization pod). Thus, host and the virtual appliance have a one to many symbiotic relationship. Using a removable virtual appliance device not only simplifies an initial invocation, but also subsequent desire to move the virtual machine. FIG. 2 shows the architecture diagram of the information handling system 100.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The virtual appliance 120 includes a system for reducing storage space requirements for an embedded hypervisor 130. The system 130 includes code for installing an application context on a hypervisor while installing files needed by the applications to a shared storage device. Such a system provides a unique application context install. Additionally, the system uniquely shares applications while reducing the space occupied on the embedded device. Also, the system uniquely loads applications from remote storage without actually caching the applications on a local system.

In such a system, storage space on the embedded device (e.g., the embedded virtual appliance) is not used for application installs. Additionally, only the first system needs to have a complete install. All similar systems only need install the application context and the path the shared storage. Also in such a system, applications can be easily shared between various hypervisor systems. Also, such a system can be implemented without requiring modifications to applications or operating systems.

Referring to FIG. 2, a system block diagram of an information handling system infrastructure architecture 200 is shown. More specifically, the information handling system hardware 210 executes a virtual machine manager application 212 (which may be e.g., a hypervisor). The consumer electronics type information handling system infrastructure architecture 200 also includes a service operating system 214 that is executed by the hardware 210.

One or more virtual appliance devices 120a, 120b, 120c may be coupled to the hardware 210. Each of devices 120 allows a self contained virtual session 220 to be executed by the hardware 210. In certain embodiments, a digital certificate of authenticity (COA) is included with each virtual session 120. The COA is checked by the hardware 210 before the appliance is invoked onto the system 200.

A data structure with computing resource requirements is included with each virtual appliance device 120. These include CPU requirements, memory requirements, storage requirements, and network bandwidth requirements. Before a virtual appliance is invoked, the virtual machine manager 212 ensures that it has enough capacity to host the appliance. The virtual machine manager 212 also contains a resource meter (which may be located on a panel of the information handling system) to represent current resource capacity and remaining resource capacity to simplify capacity planning. The virtual machine manager 212 can also maintain a database of all virtual machines that have been coupled to the device. Additionally, in certain embodiments, the system may have a more limited set of virtual machines to which the system is authorized. In this case, the virtual machine manager 212 can maintain information regarding the more limited set of virtual machines.

Because the virtual appliance devices are self contained and isolated using virtualization technology, each solution can be preconfigured and ready to use, without a customer having to install and configure the solution. The virtual appliances may be invoked onto the hardware via physical memory devices, such as USB keys, which not only simplify the initial invocation, but also any subsequent move of the virtual machine such as if the capacity of the hardware is exceeded or if a virtual machine is moved from one device to another.

The virtual machine manager 212 is configured to allow only certified appliances to execute on the device. Any time a consumer plugs in a non-certified appliance, the virtual machine manager will prompt the user to use a compatible version, or direct the user to a particular website (e.g., a particular universal resource locator (URL)) where the consumer can purchase or certify particular appliances or applications. In certain embodiments, the authentication and certification may be via an asymmetric encryption such as Deffie-Hellman type encryption, also referred to an asymmetric encryption because it uses two keys instead of a single key. In this case, the public key would be used by the service provider and the private key would be stored securely on the virtual machine or the virtual machine manager.

In certain embodiment, the hardware can include support for high definition playback. The virtual machine manager 212 can thus enable playback of high definition virtual appliance devices on the system. The virtual appliance in this case can include decryption, video and graphics processing, codecs, etc. required for Blu ray type playback.

Figure 3:
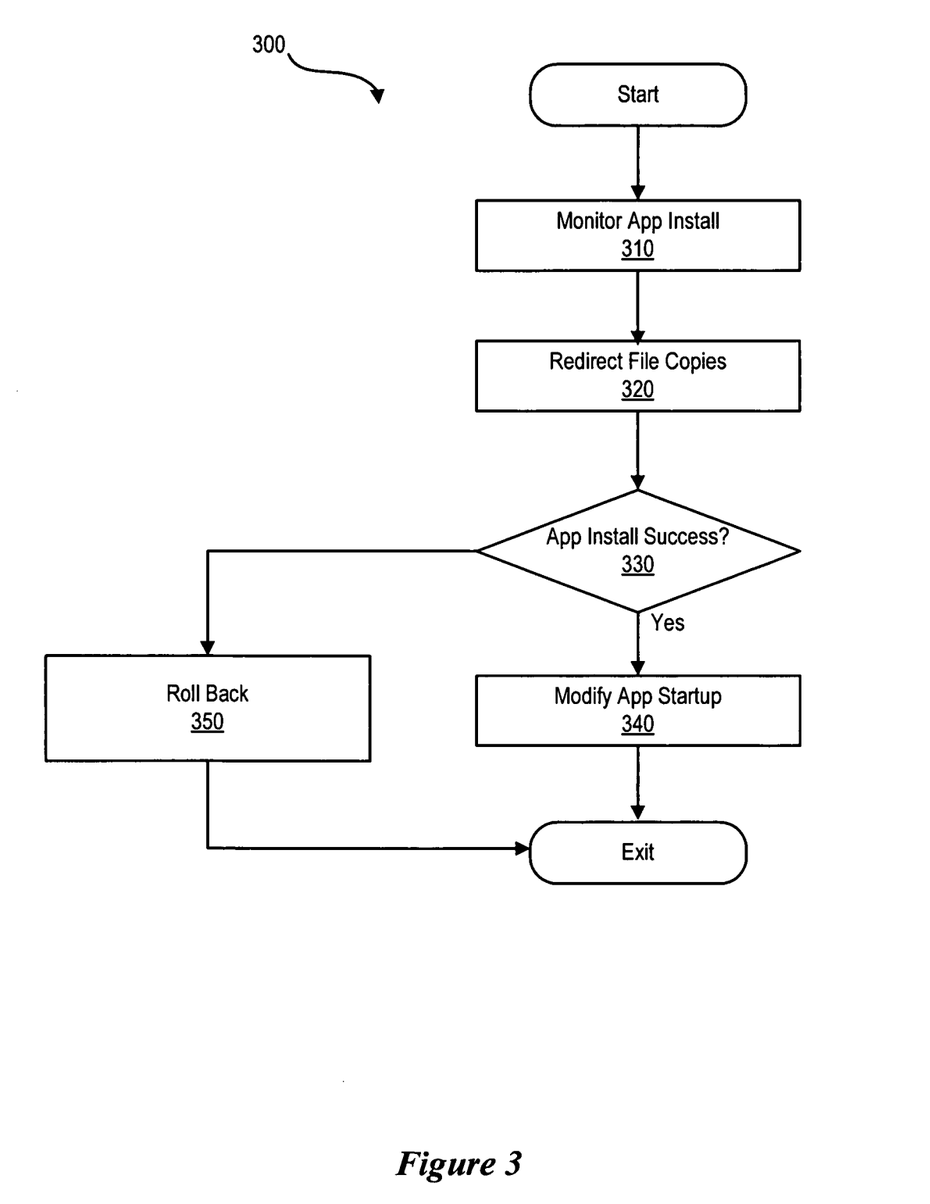
FIG. 3 shows a flow chart of the operation of a system for enabling sharing on embedded hypervisors by installing application context.

Referring to FIG. 3, a flow chart of the operation of a system for enabling sharing on embedded hypervisors by installing application context is shown. More specifically, when performing an application context only install, the system includes a universal software installer application that initiates any software install within a hypervisor operating system. For example, the universal software installer application may generate a command line such as:

HVAppInstall-SetupPath % CDDRIVE %\setup.exe-FilePath s:\SharedApps

With the command line, the universal software installer application takes a setup path of an actual application installer and a File Path refers to a shared storage device. The universal software installer application achieves an application context only install by interpreting a setup.exe application and monitoring various actions performed by the setup operation at step 310. For example, all file copy operations are redirected to the shared storage. Next, the universal software installer application achieves an application context only install by performing any registry modifications and/or configuration file modifications on the local system t redirect the file copies at step 320. The universal software installer application achieves an application context only install by placing symbolic links to files needed for application startup on the local system. For example, files copied by the universal software installer application to the local system root such as a c:/windows/system32 system root in a Microsoft Windows environment. The universal software installer application then determines if the application install was successful at step 330.

Next, if the application install was successful, the universal software installer application achieves an application context only install by modifying the application startup to include a customer startup binary as an application starting point at step 340. The universal software installer application achieves an application context only install by whatever changes were made to the local system are captured as an XML manifest file so that the same can be used to install application context on any other similar system while using the same set of files copied to shared storage.

If the application install was not successful, as determined at step 330, then the universal software installer application rolls back all of the copies and configuration changes at step 350.

Figure 4:
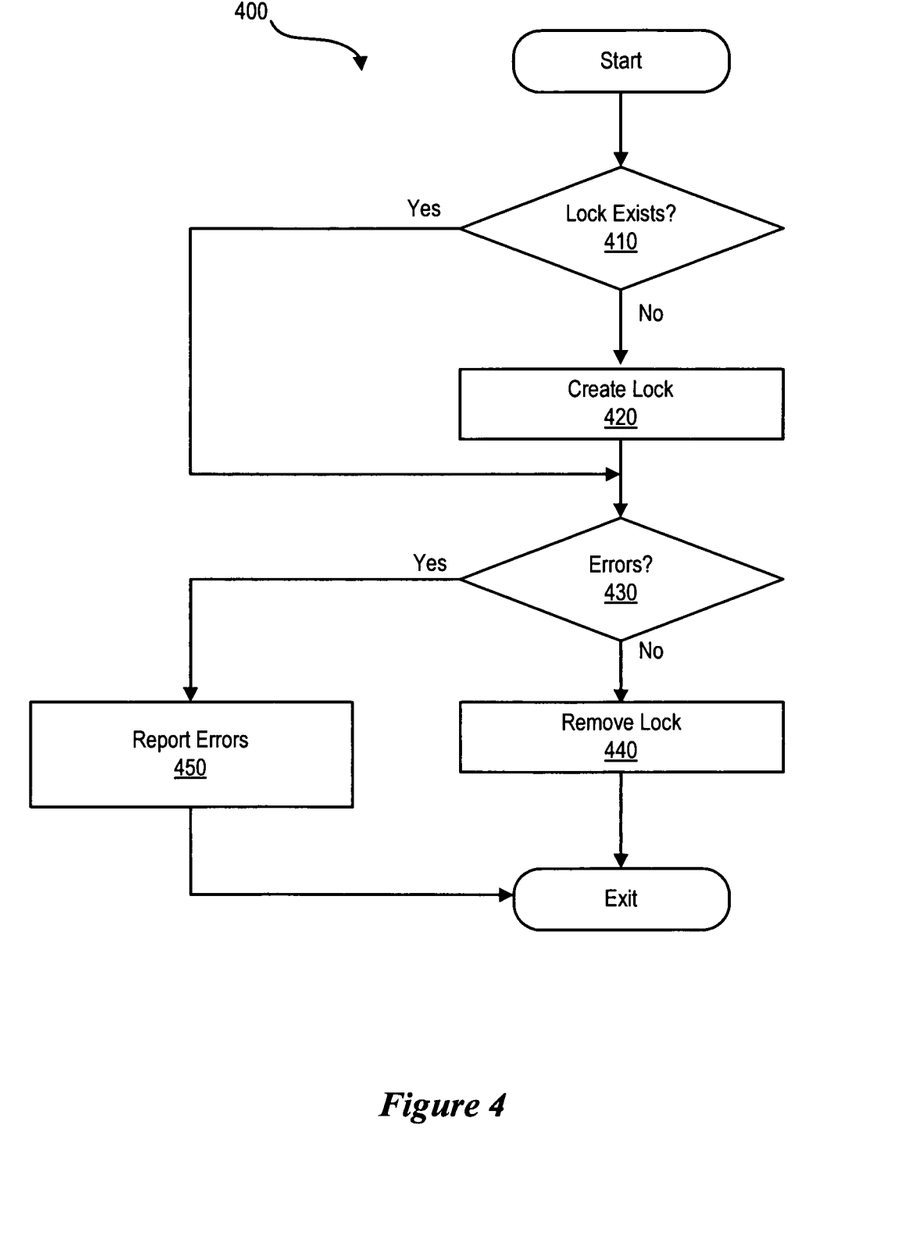
FIG. 4 shows a flow chart of the operation of an application load on a system for enabling sharing on embedded hypervisors by installing application context.

Referring to FIG. 4, a flow chart of the operation of an application load on a system for enabling sharing on embedded hypervisors by installing application context is shown.

More specifically, when performing a share application load procedure, at the end of an application install, the universal software installer application modifies the installed application startup path to include a hypervisor application startup binary (e.g., referred to as a HVAppStart binary). The hypervisor application startup binary invokes the shared application by determining whether a lock on the shared storage exists at step 410. During the startup procedure, if a lock exists, the hypervisor application startup binary waits for a predetermined time period to obtain the lock. This waiting ensures that all hypervisor hosts in the network load the shared application. If no lock exists, the hypervisor application startup binary creates a lock on the shared storage to prevent any conflicts while loading the application at step 420. The hypervisor application startup binary starts loading the application from the remote storage and determines whether the application loads without errors at step 430. If the application loads with errors, then the hypervisor application startup binary exits gracefully and leaves the application loaded as an independent entity in the memory at step 450. After the hypervisor application startup binary completes loading the shared application, the generated lock is removed at step 440. The point on the application on the local system resides in the memory. The operating system controls paging in and out of this application from the memory as needed. Thus, this application behaves as if it is loaded from local storage.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for reducing storage space requirements for an embedded hypervisor of an information handling system comprising:
    providing a virtual machine (VM) host comprising a plurality of VM resources operable to execute virtual machines;
    providing a virtual appliance device, the virtual appliance device comprising a virtual appliance stored on the virtual appliance device and a universal software installer application stored on the virtual appliance device, the virtual appliance comprising an application;
    installing a context of the virtual appliance onto the virtual machine host via the universal software installer application; and,
    hosting the universal software installer application via a hypervisor executing on the virtual appliance, the hosting comprising accessing shared storage to invoke a shared application portion of the virtual appliance; and wherein
    when performing a share application load procedure at the end of an application install, the universal software installer application modifies an installed application startup path to include a hypervisor application startup binary;
    the hypervisor application startup binary invokes the shared application portion by determining whether a lock on the shared storage exists,
    during a startup procedure, if a lock exists, the hypervisor application startup binary waits for a predetermined time period to obtain the lock;
    if no lock exists, the hypervisor application startup binary creates a lock on the shared storage to prevent any conflicts while loading the application;
    the hypervisor application startup binary loads the application from remote storage and determines whether the application loads without errors; and,
    if the application loads with errors, then the hypervisor application startup binary exits gracefully and leaves the application loaded as an independent entity.

2. The method of claim 1 wherein:
    installing the context of the virtual appliance further comprises modifying an application startup to include a startup binary as an application starting point.

3. The method of claim 1 further comprising:
    creating a lock on the shared storage to prevent any conflicts while loading the application.

4. The method of claim 3 further comprising:
    removing the lock after loading of the shared application completes by the hypervisor application startup binary.

5. The method of claim 1 wherein:
    the universal software installer application performs any registry modifications and configuration file modifications on the VM host.

6. An apparatus for reducing storage space requirements for an embedded hypervisor of an information handling system comprising:
    a virtual machine (VM) host comprising a plurality of VM resources operable to execute virtual machines;
    a virtual appliance device, the virtual appliance device comprising a virtual appliance stored on the virtual appliance device and a universal software installer application stored on the virtual appliance device, the virtual appliance comprising an application;
    means for installing a context of the virtual appliance onto the virtual machine host via the universal software installer application; and,
    means for hosting the universal software installer application via a hypervisor executing on the virtual appliance, the hosting comprising accessing shared storage to invoke a shared application portion of the virtual appliance; and wherein
    when performing a share application load procedure at the end of an application install, the universal software installer application modifies an installed application startup path to include a hypervisor application startup binary;
    the hypervisor application startup binary invokes the shared application portion by determining whether a lock on the shared storage exists,
    during a startup procedure, if a lock exists, the hypervisor application startup binary waits for a predetermined time period to obtain the lock;
    if no lock exists, the hypervisor application startup binary creates a lock on the shared storage to prevent any conflicts while loading the application;
    the hypervisor application startup binary loads the application from remote storage and determines whether the application loads without errors; and,
    if the application loads with errors, then the hypervisor application startup binary exits gracefully and leaves the application loaded as an independent entity.

7. The apparatus of claim 6 further comprising:
    means for modifying an application startup to include a startup binary as an application starting point.

8. The apparatus of claim 6 further comprising:
    means for creating a lock on the shared storage to prevent any conflicts while loading the application.

9. The apparatus of claim 8 further comprising:
    means for removing the lock after loading of the shared application completes by the hypervisor application startup binary.

10. The apparatus of claim 6 wherein:
the universal software installer application performs any registry modifications and configuration file modifications on the VM host.

11. An information handling system comprising:
a virtual machine (VM) host comprising a plurality of VM resources operable to execute virtual machines;
a virtual appliance device, the virtual appliance device comprising a virtual appliance stored on the virtual appliance device, the virtual appliance comprising an application;
a memory, the memory storing a system a universal software installer application for reducing storage space requirements for an embedded hypervisor of the information handling system, the universal software installer application comprising instructions for
installing a context of the virtual appliance onto the virtual machine host via the universal software installer application; and,
hosting the universal software installer application via a hypervisor executing on the virtual appliance, the hosting comprising accessing shared storage to invoke a shared application portion of the virtual appliance; and wherein
when performing a share application load procedure at the end of an application install, the universal software installer application modifies an installed application startup path to include a hypervisor application startup binary;
the hypervisor application startup binary invokes the shared application portion by determining whether a lock on the shared storage exists,
during a startup procedure, if a lock exists, the hypervisor application startup binary waits for a predetermined time period to obtain the lock;
if no lock exists, the hypervisor application startup binary creates a lock on the shared storage to prevent any conflicts while loading the application;
the hypervisor application startup binary loads the application from remote storage and determines whether the application loads without errors; and,
if the application loads with errors, then the hypervisor application startup binary exits gracefully and leaves the application loaded as an independent entity.

12. The information handling system of claim 11 wherein the universal software installer application further comprises instructions for:
modifying an application startup to include a startup binary as an application starting point.

13. The information handling system of claim 11 wherein the universal software installer application further comprises instructions for:
creating a lock on the shared storage to prevent any conflicts while loading the application.

14. The information handling system of claim 13 wherein the universal software installer application further comprises instructions for:
removing the lock after loading of the shared application completes by the hypervisor application startup binary.

15. The information handling system of claim 11 wherein:
the universal software installer application performs any registry modifications and configuration file modifications on the VM host.

* * * * *